May 12, 1970     W. D. HAENTJENS     3,511,185
MECHANICAL SEAL FOR SLURRY PUMP
Filed Aug. 30, 1968
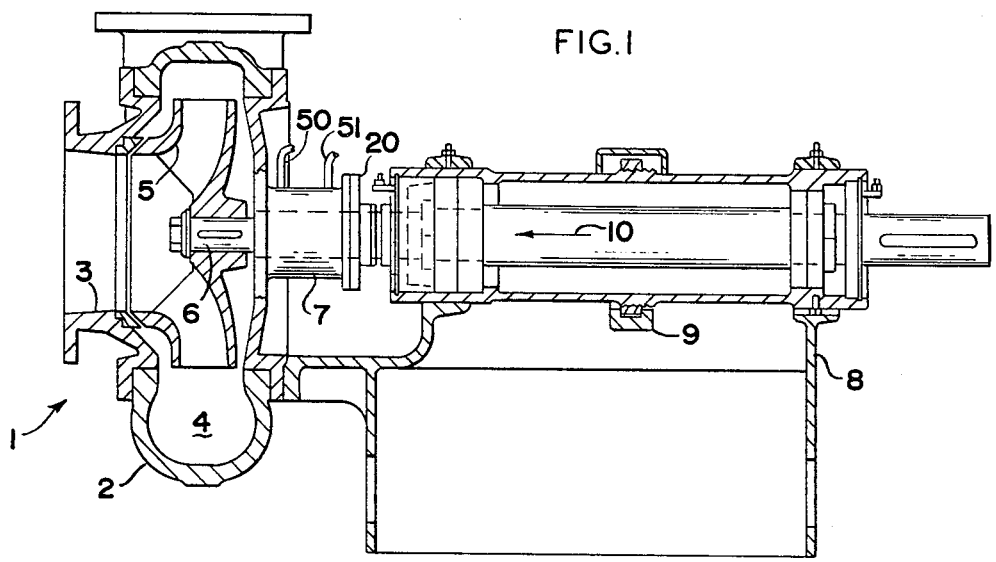
FIG. 1
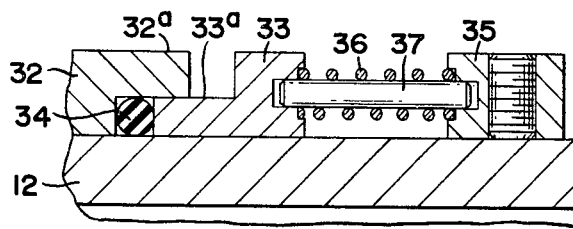
FIG. 3
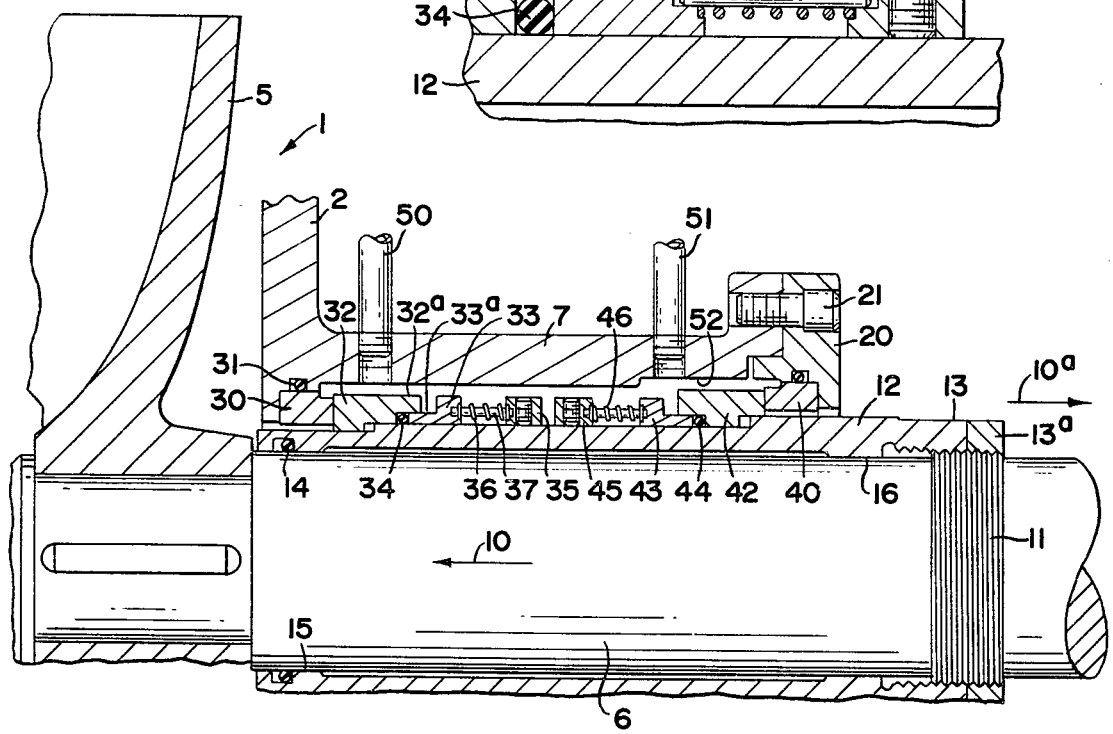
FIG. 2
INVENTOR.
WALTER D. HAENTJENS
BY
*Oldham & Oldham*
ATTORNEYS.

United States Patent Office 3,511,185
Patented May 12, 1970

3,511,185
MECHANICAL SEAL FOR SLURRY PUMP
Walter D. Haentjens, R.F.D. 31, Sugarloaf, Pa. 18249
Filed Aug. 30, 1968, Ser. No. 756,482
Int. Cl. F04d 29/00; F16j 15/00
U.S. Cl. 415—131                    5 Claims

ABSTRACT OF THE DISCLOSURE

A seal is provided for a pump assembly wherein the impeller shaft is positioned for axial adjustment to compensate as wear occurs. The seal includes a sleeve in threaded engagement with the shaft and received in the housing but with an outer end protruding therefrom. The sleeve is in threaded engagement with the shaft for sleeve adjustment. Double mechanical seal means are positioned intermediate the housing and the sleeve so that after axial adjustment of the shaft and sleeve assembly, the sleeve can be returned substantially to its former position so that the seal means and any springs therein are returned to substantially their prior positions.

---

The present invention relates to mechanical seals for pump assemblies, and particularly to seal means used on a pump for pumping various slurries.

Heretofore there have been many different types of seals provided in different pump assemblies. In pumps for moving slurries of materials, there is an appreciable amount of wear that occurs in the pumping chamber between the pump housing and the portion of the impeller thereadjacent. Means have been provided heretofore, and one example of them is shown in U.S. Pat. No. 1,-181,999, to provide axial adjustment of the shaft and impeller in the pumping chamber for wear compensation action. When such wear adjustments are made, it has been difficult to maintain the rotating seals in proper engagement with the stationary seal faces. Particularly, it is difficult to maintain a seal in effective engagement after any appreciable wear adjustment movement has occurred.

The general object of the present invention is to provide a novel and improved mechanical seal mounting for use in pumps to facilitate axial adjustment of the impeller and supporting shaft and to maintain it in good operative sealed engagement with its pump housing.

Another object of the invention is to provide a balanced double mechanical seal for the impeller shaft in a pump especially adapted for pumping slurries of material therein and wherein appreciable axial adjustment can be made of the impeller shaft without interfering with the effective, efficient action of the pair of mechanical seal means provided in the pump assembly.

Another object of the invention is to provide a novel adjustable seal means, including a pair of individual seal members positioned in axially spaced relationship on the pump shaft sleeve, and to maintain such pair of seal means in effective balanced operative engagement with the pump shaft even after appreciable axial movement of the shaft in relation to the seal means present.

Another object of the invention is to position seal means for a pump shaft on and in engagement with a sleeve member rotatably carried by the pump impeller shaft for axial adjustment of the sleeve and of the seal means associated therewith upon wear compensation movement or adjustment of the impeller shaft.

The foregoing and other objects and advantages of the present invention will be made more apparent as the specification proceeds.

In the accompanying drawings:
FIG. 1 is a vertical section of a slurry pump and housing assembly, embodying the principles of the overall structure of the invention;
FIG. 2 is an enlarged fragmentary vertical section through the particular mechanical seal means of the invention;
FIG. 3 is a fragmentary enlarged section of a portion of the seal assembly.

When referring to corresponding members shown in the drawings and referred to in the specification, corresponding numerals are used to facilitate comparison therebetween.

The present invention, in general, relates to a novel mechanical seal means provided for a pump and wherein a pair of axially spaced mechanical seals are carried by a sleeve that is in rotatable, but sealed engagement with the pump impeller shaft. These seal means are provided between a portion of the pump housing and the sleeve on the pump impeller shaft. Such sleeve is longitudinally adjustable on the pump impeller shaft whereby the sleeve can be backed off into substantially its original position after axial adjustment movement of the pump impeller shaft inwardly of the pump housing has been made for wear compensation purposes. Hence, the seal means can be retained in substantially the same operative positions even after appreciable wear compensation adjustment has been made of the shaft and impeller assembly. Also the seal face pressures can be maintained at substantially their original values.

With reference to the details of the structure shown in the drawings, a pump assembly is indicated as a whole by the numeral 1. This pump assembly 1 includes a pump housing 2 having an inlet 3 provided on one side thereof and a pump chamber 4. A conventional type of an impeller 5 is positioned in the pump chamber 4 by a drive shaft 6. Usually the pump housing 2 has an axially extending offset 7 provided therein and the shaft 6 extends through this offset 7 and is suitably journalled in and positioned by a shaft support housing 8. The shaft 6 extends completely through this shaft support housing 8 and is connected at its exposed end to any conventional drive means (not shown).

The shaft support housing 8 is of the known type whereby arcuate movement of a control ring 9 will effect axial movement of the shaft 6, and normally of its support bearings, in relation to the shaft support housing 8 and to the pump housing 2. Normally such movement would be axially outwardly of the pump housing as indicated by the arrow 10, whereby the pump impeller 5 is moved axially towards the inlet 3 to effect a "take-up" as wear occurs between the stationary and movable parts.

The novel and important features of the present invention are shown in the detail of the pump assembly 1 in FIG. 2. In this instance, the shaft 6 has threads 11 formed on its periphery at one area thereof, and a sleeve 12 is attached to the shaft 6 by an internally threaded section on one end of this sleeve engaging the external threads 11 whereby the longitudinal position of the sleeve on the shaft 6 can be adjusted. Normally, the periphery of the sleeve 12 in the exposed end area indicated at 13 is provided with some means thereon to facilitate movement of the sleeve 112 arcuately of the shaft 6 for longitudinal adjustment of the sleeve in relation to the shaft. Such means 12 may comprise, for example, a hexagonal or an octagonal section formed on the periphery of the sleeve to facilitate engagement of a suitable wrench or other member therewith. It naturally also is seen that the means 13 are provided on the sleeve 12 at a portion thereof that protrudes from the offset 7 or any adjacent portion of the pump housing 2. The sleeve 12 is suitably sealed in relation to the shaft 6, as by an O-ring 14 carried by the sleeve adjacent its axially inner end. Any suitable bearing surfaces, indicated at 15 and 16, are provided formed on the sleeve 12 to support or position it on the shaft 6.

The novel seal means of the invention is completed by the use of a pair of axially spaced mechanical seal assemblies that engage with the connection between the sleeve 12 and offset 7 adjacent each end thereof. Normally such offset 7 has an end cap or plate 20 secured thereto as by bolts 21 to retain the seal assemblies in operative positions and to permit assembly of the pair of seal means in association with the sleeve 12.

In this embodiment of the invention, a pair of substantially conventional balanced seals are shown in engagement with the sleeve 12, but if desired, conventional unbalanced seals could be used with the same features of the present invention as described herein.

FIG. 2 shows that the pump housing 2, or some separate head bolted or otherwise fastened to the pump housing, provides a housing for the seals of the invention in the offset portion 7 which, as indicated, may or may not be formed as a unit with the pump housing. In all events, a stationary sealing ring 30 is pressed against an end or shoulder portion of the offset 7 and is sealed on its radially outer surface to such offset 7 by a conventional sealing ring 31. A rotating sealing ring or member 32 has a flat axially inner end in good mechanical engagement with the flat axially outer end of the sealing ring 30 and a radially inner edge of the rotating sealing ring 32 is in sliding engagement with the periphery of the sleeve 12. A driven seal ring 33 is in telescopic engagement with the axially outer end of the rotating sealing ring 32 and a sealed connection is provided therebetween by a conventional O-ring 34 received in a chamber formed between telescopically engaging end portions 32a and 33a of the rotatable sealing ring 32 and the drive seal ring 33, respectively. The radially inner surface of such O-ring chamber is provided by the peripheral portion of the sleeve 12 with which such sealing rings 32 and 33 are operatively associated.

Some conventional type of a stop or fixed member or ring 35 is secured to the periphery of the sleeve 12 spaced axially outwardly from the driven sealing ring 33 and a plurality of conventional pressure members, such as several coil springs 36, are compressed between the stop means 35 and the driven sealing ring 33 to bias such driven sealing ring 33 at all times in an axially inward direction to aid in forming the desired seal between the rings 32 and 33. Positive drive of the driven sealing ring 33 is assured by the provision of members, such as conventional axially extending pins indicated at 37, operatively engaging with and extending between the stop means 35 and the driven sealing ring 33 so that such ring 33 will rotate as a unit with the sleeve 12 at all times. Such springs 36 likewise continually maintain the rotating sealing ring 32 in good operative engagement with the stationary sealing ring 30 and prevents any leakage therebetween, at the abutted flat sealing faces thereof.

The other seal assembly provided in association with the sleeve 12, is usually, of the same construction as that seal means at the axially inner end of the sleeve 12 and hence a stationary sealing ring 40, a rotating sealing ring 42, and a driving sealing ring 43 are provided that correspond to the members in the other seal assembly. Again, an O-ring 44 is positioned intermediate telescopically engaging portions of the driving sealing ring 44 and the rotatable sealing ring 43 and a stop means or member 45 is secured to the sleeve 12. Springs 46 urge the sealing rings 43 and 42 axially outwardly at all times to engage the ring 42 with an end portion of the sealing ring 40 as previously described. The driven ring 43 is driven in association with the stop means 45 in the same manner of the other seal assembly.

In operation of the improved seal means of the invention, as wear occurs between the axially outer end of the impeller 5 where it is positioned immediately adjacent the inlet 3 portion of the pump housing 2, then the means provided on the shaft support housing 8 can be adjusted for axial movement of the pump and impeller assembly in the direction of the arrow 10. Such movement, of course, carries the sleeve 12 axially with relation to the pump housing 2 and the offset portion 7 provided thereon, or suitably attached thereto. While some short movement of such sleeve 12 is not objectionable, if continued take-up action occurs, disruption of the assemblies of the seal means between the shaft 6 and the pump housing 2 will occur. Hence, by the novel relationship between the sleeve 12, and shaft 6, and the seal means, the sleeve can be rotated with with relation to the shaft 6 to move the sleeve 12 along threads 11 in the direction shown by the arrow 10a and thus the sleeve can be returned back to its previous position, or substantially to its previous position prior to the take-up action effected on the shaft and impeller assembly by conventional means associated with the shaft support housing 8. Such return movement will bring the seal means into substantially the same operative relationship with the sleeve 12 as such pair of individual seal assemblies had originally in the pump assembly. Thus, the take-up action on the pump assembly 1 is limited solely by the adjustment provision provided in the pump assembly or else when the parts become too badly worn for further operation without disassembly and/or repair of the pump.

In FIG. 2 of the drawings, a pair of conduits 50 and 51 are shown connecting to a chamber 52 formed between the sleeve 12 and the radially inner surface of the offset 7. Hence such chamber 52 and the members therein can be cooled or lubricated by a fluid or pressurized other than by the pumped fluid by external means connecting to the conduits 50 and 51

It should be noted that the novel seal of the invention can be used with any type of impeller and that it applies to any seal using compression springs therein so that the springs are not improperly increased or decreased in operating pressure when wear take-up movement of the impeller shaft is effected.

While one complete embodiment of the invention has been disclosed herein, it will be appreciated that modification of this particular embodiment of the invention may be resorted to without departing from the scope of the invention as defined in the appended claims.

What is claimed is:

1. In a slurry pump assembly including a housing defining a pump chamber, an impeller, a shaft positioning said impeller in said housing chamber, said housing having a tubular section through which said shaft extends, and means journalling said shaft, said shaft and impeller being positioned for axial adjustment, an axial adjustable seal means for said shaft in relation to said chamber and comprising a sleeve in threaded engagement with said shaft and received in said tubular section but having an outer end protruding therefrom, said sleeve being sealed to said shaft, means on the outer end of said sleeve to facilitate turning said sleeve in relation to said shaft to adjust said sleeve axially of said shaft, and double seal means positioned intermediate said tubular section and said sleeve in axially spaced relation whereby after axial inward movement of said shaft and sleeve for wear adjustment, said sleeve can be returned substantially to its former position so that said seal means are returned to substantially the same operative positions as they had prior to such adjustment.

2. A pump assembly as in claim 1 where said double seal means comprises a pair of seal assemblies each including a stationary end seal ring engaging said housing,
a rotary second seal ring abutted against said first seal ring and carried by said sleeve,
a third driven seal ring on said sleeve engaging and driving said second seal ring,
a stop member secured to said sleeve,
coil spring means engaging said stop member and biasing said third seal ring towards said second seal ring, and
means operatively securing said stop member and said third seal ring together to drive the same.

3. In a slurry pump assembly including a housing defining a pump chamber, an impeller, a shaft positioning said impeller in said housing chamber, said housing having a tubular offset section through which said shaft extends, and means journalling said shaft, said shaft and impeller being positioned for axial adjustment, an axial adjustable seal means for said shaft in relation to said chamber and comprising,
a sleeve in threaded engagement with said shaft and received in said tubular offset section but having an outer end protruding therefrom, said sleeve being sealed to said shaft,
means on the outer end of said sleeve to facilitate turning said sleeve in relation to said shaft to adjust said sleeve axially of said shaft, and
seal means positioned intermediate said tubular offset section and said sleeve and including a spring means biasing a portion of said seal means to operative position and with the spring means being abutted against a member secured to said sleeve whereby after axial movement of said shaft and sleeve, said sleeve can be returned substantially to its former position and said spring means can be returned to substantially its previous operating condition.

4. A pump assembly as in claim 3 which includes said offset section forming a chamber surrounding said seal means and having pressurized liquid supply means connecting thereto whereby said seal means can be subjected to pressure greater than that of the internal pressure existing in said pump chamber whereby said sealing means faces are lubricated or cooled by said pressurizing liquid.

5. A pump assembly as in claim 3 where said seal means comprises a pair of seal assemblies each including
a stationary end seal ring engaging said housing,
a rotary second seal ring abutted against said first seal ring and carried by said sleeve,
a third driven seal ring on said sleeve engaging and driving said second seal ring, and
spring means operatively biasing said third seal ring towards said second seal ring,
the said spring means of the pair of seal assemblies biasing said third seal rings in opposite directions and having portions operatively secured to said sleeve whereby on axial movement of said sleeve the forces set up in said spring means can be varied.

References Cited

UNITED STATES PATENTS

| 1,671,054 | 5/1928 | Welsh | 103—114 |
| 2,245,866 | 6/1941 | McLachlan | 103—111 |
| 2,362,436 | 11/1944 | Stratford | 103—111 |
| 2,710,205 | 6/1955 | Bikich | 277—61 |
| 2,824,759 | 2/1958 | Tracy | 103—111 |

HENRY F. RADUAZO, Primary Examiner

U.S. Cl. X.R.

277—61